United States Patent
Chheda et al.

[11] Patent Number: 6,151,512
[45] Date of Patent: Nov. 21, 2000

[54] COMMUNICATION SYSTEM HAVING OPTIMUM RESOURCE ARRANGEMENTS IN A MULTI-SECTORED ENVIRONMENT AND METHOD THEREFOR

[75] Inventors: Ashvin Chheda, Dallas; Farhad Bassirat, Plano, both of Tex.

[73] Assignee: Nortel Networks Corporation, Montreal, Canada

[21] Appl. No.: 08/864,507

[22] Filed: May 28, 1997

[51] Int. Cl.[7] ........................................... H04B 1/38
[52] U.S. Cl. ..................... 455/562; 455/561; 370/331
[58] Field of Search ................... 455/422, 436, 455/439, 440, 442, 452, 62, 560, 561, 562; 370/331, 334

[56] References Cited

U.S. PATENT DOCUMENTS

| | | | |
|---|---|---|---|
| 4,775,998 | 10/1988 | Felix et al. | 455/450 |
| 5,265,263 | 11/1993 | Ramsdale et al. | 455/442 |
| 5,276,907 | 1/1994 | Meidan | 455/452 |
| 5,485,631 | 1/1996 | Bruckert | 455/450 |
| 5,535,423 | 7/1996 | Dupuy | 455/562 |
| 5,559,527 | 9/1996 | Quinn | 455/422 |
| 5,697,055 | 12/1997 | Gilhousen et al. | 455/422 |
| 5,697,057 | 12/1997 | Bursztejn et al. | 455/450 |
| 5,742,911 | 4/1998 | Dumbrill et al. | 455/562 |
| 5,809,401 | 9/1998 | Meidan et al. | 455/450 |
| 5,825,764 | 10/1998 | Rudolph | 455/422 |
| 5,854,986 | 12/1998 | Dorren et al. | 455/562 |
| 5,983,118 | 11/1999 | Lee | 455/562 |

OTHER PUBLICATIONS

Ashvin Chheda et al., "Patent Disclosure: Method of Allocating Channel Elements in Multi Sectored CDMA Environments if Two or More Base Stations Used Per Cell", pp. 1–9.

William C. Jakes, "Microwave Mobile Communications", Chapter 5—fundamentals of diversity systems, An IEEE Press Classic Reissue, pp. 309–319.

John G. Proakis et al., "Communication Systems Engineering", Library of Congress Cataloging–in–Publication Data, 1994, pp. 840–841.

*Primary Examiner*—Thanh Cong Le
*Assistant Examiner*—Darnell R. Armstrong
*Attorney, Agent, or Firm*—Carr & Storm, L. L. P.

[57] ABSTRACT

A configuration of base stations and sectors within cells of a CDMA wireless communication network provide greater call handling capacity. By optimally configuring sectors of a cell controlled by multiple base stations, fewer channel elements are required to implement the desired service and a resultant system has improved signal demodulation, lower power requirements, improved performance, and lower cost for a service provider. The base stations are configured to support "N" sectored cells to ensure that each cell has a maximum amount of capacity for all mobile users therein. This method involves configuring the sectors serviced by a same base station adjacent to one another. By configuring the sectors associated with base stations in this manner, there are fewer instances of soft handoff and more instances of softer handoff. Furthermore, configuring the sectors to be adjacent to one another ensures optimal power collection by each of the sectors during the communication process.

15 Claims, 8 Drawing Sheets

COMMUNICATION SYSTEM HAVING OPTIMUM RESOURCE ARRANGEMENTS IN A MULTI-SECTORED ENVIRONMENT AND METHOD THEREFOR

TECHNICAL FIELD

The present invention relates in general to multi-sectored cells, and in particular, to a communication system with soft and softer handoff capability in multi-sectored cells.

BACKGROUND INFORMATION

With the advent of widespread use of cellular telephones and the corresponding growth of wireless subscribers for using such telephones, a need has arisen for increasing a network's capacity within an existing communication infrastructure. Before describing how this need has been addressed, however, a general structure of a communication system will be described.

FIG. 1 illustrates a basic cellular network, which comprises a plurality of radio cells, respectively labeled A–G. Such radio cells are defined by a base station (BS) at their center and are distributed evenly in clusters. An area covered by each of the plurality of radio cells is indicated by the dashed lines surrounding the radio cell. A number of communication technologies are currently used by the cellular and PCS service providers, such as AMPS (FDMA), TDMA, and CDMA. Both AMPS and TDMA do not use a same frequency in the adjacent cells. In these technologies, the same frequency is reused in every "n" cells, which are clustered together. This concept is referred to as a principle of a "repeat cell", and alternatively, as a "frequency reuse factor".

In CDMA technology, the same frequency is used in all cells within the network. Mobile users move from one cell to another cell through a process known as "soft" handoff without switching a frequency at which the mobile user is operating. Where another frequency is used within the CDMA network, the mobile user may handoff to another frequency by switching its frequency to the new channel frequency. This process is referred to as "hard" handoff. Since the same frequency is used throughout the network, the mobile users of the surrounding cells will generate interference in the cells with which they are communicating. The ratio of the in-cell interference, to the total interference as seen by the base station of each cell, is referred to as the "frequency reuse factor". Note that this terminology is specific to CDMA technology and is modified from terms typically used with TDMA and AMPS technology.

FIG. 2 illustrates the basic components of a wireless communication network architecture. As is illustrated in FIG. 2, the infrastructure of a communication network generally includes multiple mobile switching centers (MSCs) which provide control, tracking, and data about mobile users within a predetermined area. FIG. 2 illustrates a distributed home location register wireless network architecture which is typically utilized to establish an infrastructure for a wireless communications network. In such an architecture, a home MSC tracks and determines where a mobile user is currently registered. A mobile user is registered on a home location register (HLR) within a home mobile switching center (MSC). When the mobile user travels away from their home MSC, the mobile user is detected by a second mobile switching center. The second mobile switching center then provides information to the home MSC and the home MSC provides control information to register the location of the mobile user on a visiting location register (VLR) within the visited MSC. An illustrative example of operation will be provided below.

In FIG. 2, if mobile user 222 is registered on HLR 208 of MSC 210, MSC 210 is said to be a home MSC of mobile user 222. When mobile user 222 travels from home MSC 210, mobile user 222 will be detected by a second MSC 212 via base station B 220. MSC 212 provides information to MSC 210 indicating that mobile user 222 is within an area serviced by MSC 212 and base station B 220. MSC 210 subsequently registers a location of mobile user 222 on VLR 214 within MSC 212.

Subsequently, when a call is received by MSC 212 from public switched telephone network (PSTN) 204, the current visited MSC 212 determines whether the mobile user to whom the call is directed is registered in HLR 216 or VLR 214. Since mobile user 222 is registered in VLR 214 of MSC 212, MSC 212 communicates information with the mobile user's home MSC 210 of the call is directed to mobile user 222. Through this method, home MSC 210 is able to transfer the call to a current MSC 212 so that mobile user 222 receives the call even when they are not within their own home MSC.

As more and more mobile users, such as mobile user 222, utilize a cell within a wireless communication network, a higher demand for service is created. To meet this demand for service, an increased number of communication channels is required. However, the number of channels which may be utilized is limited by an available bandwidth of frequencies within a cell. As the right to use certain frequency bandwidths is a limited commercial commodity, the costs associated with obtaining such frequencies are not minimal. Therefore, the overhead associated with obtaining increased frequency bandwidth is often too substantial to be commercially viable and implemented in wireless communication networks.

Additionally, in implementations in which communication channels are limited, a service provider may opt to implement smaller communication cells or to increase a number of sectors of the cells, in those areas where a demand for service is high. The implementation of small cells is referred to as "cell splitting." When cell splitting is implemented, a capacity of a system may be increased by reducing a size of the cell so that the total number of channels available per unit area is increased. "Cell splitting" is achieved by placing base stations at specific points in a cellular pattern, typically reducing a cell area by a factor of 3 or 4. By repeatedly splitting cells, a system capacity can be tailored to meet traffic capacity requirements demanded by customers. For additional information on cell splitting, refer to *Cellular Radio Principles and Design*, by Raymond C. V. Macario, published by McGraw-Hill, Inc. in 1993, which is hereby incorporated by reference herein.

While the use of smaller cells increases a capacity of a wireless communication network, the overhead associated with implementing smaller cells is not insignificant and may even be a determinative factor in a decision by a service provider. The overhead costs associated with cell splitting are not inexpensive as cell splitting requires the addition of base stations for each of the split cells. As well, the real estate where these small cell base stations are deployed must also be obtained by the provider of wireless communication services.

In situations where the overhead costs associated with deploying additional base stations through cell splitting (using smaller cells) in new zones or land sites is prohibitive, a number of sectors within a cell of a wireless communication network can be increased. Such a configuration is illustrated in FIG. 3. A cell is divided into sectors through the use of directional antennas at base stations. The directional antennas reduce the level of interference in communications within a cell as signal interference is only detected in an area to which the directional antenna is pointed. In implementation, however, most base stations are only able to support a limited number of sectors. For example, in code division multiple access (CDMA) technology, base stations are often designed to support three sectors within a cell of a communications network. Therefore, as the number of sectors per cell is increased to meet the ever increasing demands for service, a point may soon be reach where the base station hardware is unable to support increase in a number of sectors. The use of sectors and the limitations thereof is provided in an TIA/EIA/IS-95-A and TSB74 standard published by TIA/EIA, which is hereby incorporated by reference herein.

The increase in the number of sectors requires some method of allocating the resources of the cell to the users. This point is quite critical in CDMA technologies, where frequency of operation of the sectors and the cells are the same. During handoff from one sector to another, resources are shared. Such sharing places an extra burden on the network. Therefore, a need exists for an apparatus and method for allocating hardware resources in a multi-sectored CDMA cell that implements more than one base station per cell such that increased demands for service are met.

SUMMARY OF THE INVENTION

The previously mentioned needs are fulfilled with the present invention. Accordingly, there is provided, in a first form, a communication system which utilizes multiple base stations in multi-sectored cells to implement an efficient wireless communication network. Chief among the concerns associated with implementing multiple base stations in a single cell of a wireless communication network is the need to configure sectors to be serviced by the base stations in an efficient manner. The present invention recognizes that by placing all sectors capable of being serviced by one base station adjacent to one another, operation costs associated with soft "handoff" and diversity recombination will be decreased.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
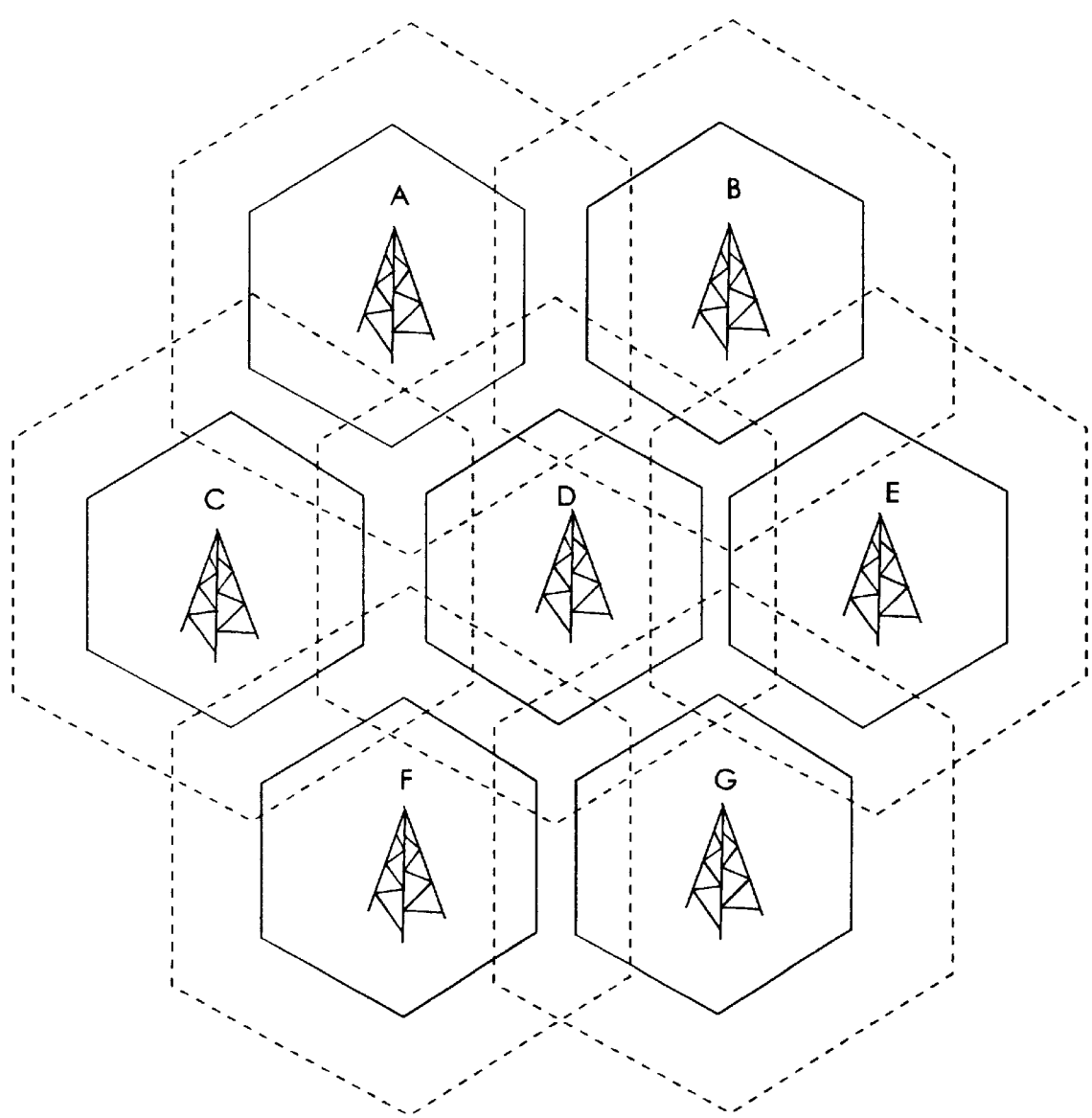
FIG. 1 illustrates, in block diagram form, a cellular communication network architecture.
Figure 2:
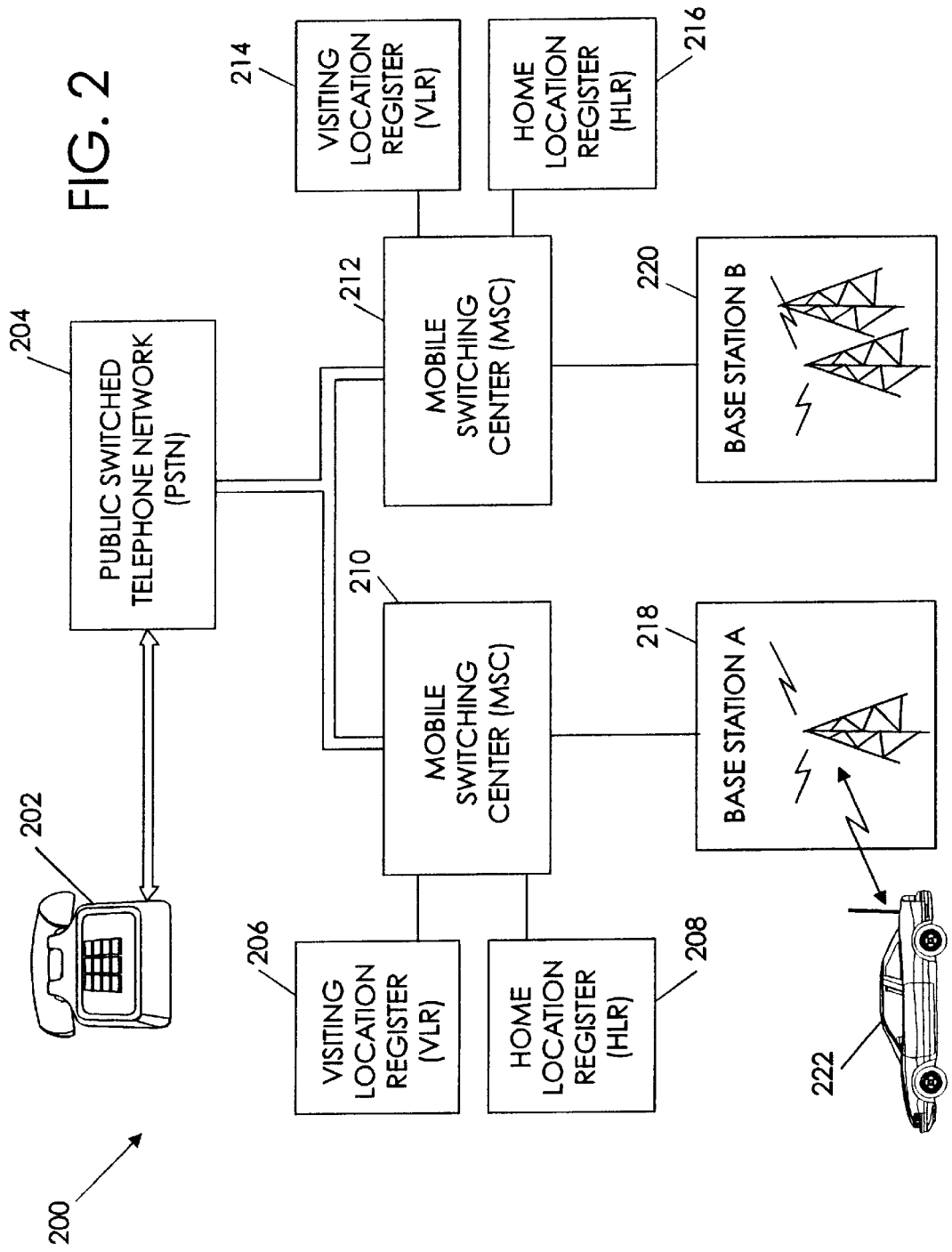
FIG. 2 illustrates, in block diagram form, a wireless network with a distributed home location register architecture.

With the increase of subscribers in wireless communication networks, demand for services has substantially increased. To compensate for these increased use requirements, the present invention implements a unique methodology for configuring base stations and sectors within cells of a communication network to provide greater call handling capacity. In one embodiment of the present invention, the communication network is a CDMA network. By optimally configuring sectors of a cell controlled by multiple base stations, fewer channel elements are required to implement the desired service and a resultant system has improved signal demodulation, lower power requirements, improved performance, and lower costs for a mobile telephone subscriber. Such desirable characteristics are due to the occurrence of softer handoffs in a CDMA technology. The occurrence of softer handoff does not occur in GSM, JDC, or ADC technologies.

Before describing the apparatus methodology for configuring a multi-sectored cell in a CDMA communication network in greater detail, several fundamental principles of cellular communication networks will be provided herein. It should be noted that the following descriptions refer to communication systems based on a CDMA technology.

As previously mentioned, there are a number of methods by which CDMA cellular and PCS base stations can be configured or deployed within a cell where there is a high demand for service. It should be understood that the present invention may be implemented using cellular or PCS technologies. While increasing a number of channels available by allocating additional frequency bandwidth is one option, that option results in high overhead costs as such frequency bandwidth is not inexpensive. A more cost effective methodology is to increase a number of sectors within cells where a demand for service is high. Currently, however, most CDMA technologies provide base station hardware which only supports a limited number of sectors. Traditionally, this limited number of sectors is three. Therefore, when a cell should be divided into a greater number of sectors than three, additional base stations and their attendant hardware should be added to the cell. Consequently, a means of arranging multiple base stations within a cell should be optimized.

Increased sectorization and multiple base stations affects the capacity, handoff states and power control within the CDMA network. Hence, each of these issues will be described in general to explain a role of each in determining the configuration of multiple base stations within a cell of a communications network.

The concept of "capacity" relates to a number of users that can be supported by a wireless communication system at a given instant in time. In a cellular/PCS network based on CDMA technology, capacity is "soft." Capacity is soft when a number of users can be increased to a certain level based on degradation of service. Stated another way, in a cellular/PCS system based on CDMA technology, users are prohibited from using the system by interference levels present in the system. The more users utilizing a cell, the more interference is present. With increased interference comes lower voice quality and less desirable call characteristics.

As previously mentioned, capacity in a given geographical area can be increased by sectorization of a cell which covers that geographical area. Stated another way, increasing a number of sectors per cell, increases the number of users that can be supported in any instant of time. To prove this point, consider the following discussion.

An equation for determining pole or reverse link capacity in a CDMA cellular system is:

$$N = \frac{W}{R} \times \frac{1}{E_b/N_0} \times \frac{1}{d} \times F \times G \qquad (1)$$

where:
N=a number of calls per cell (assuming Raleigh fading on a reverse link);
W=a spread spectrum bandwidth (assuming a value is 1.25 MHz);
R=a data rate in Kbps (assuming a value of 9600 bps);
$E_b/N_0$=a bit energy divided by a noise power spectral density (wherein the assumed value is 7.0 dB);
d=a voice duty cycle (assumed value is 40%);
F=a frequency reuse coefficient (value varies in response to a number of sectors, antenna type and orientation, etc.); and
G=a sectorization gain.

Additionally, a frequency reuse factor of cells is defined as a ratio of interference from mobile user within that cell to the total interference from all cells. This ratio is given as follows:

$$F = \frac{N_i}{N_i + N_0} \qquad (2)$$

where
$N_i$=Interference from mobile stations within cell of interest; and
$N_0$=Interference from all mobile stations in all other cells.

When directional antennas are used to form a number of sectors, S, within a cell, an interference realized within the cell is divided by S because the antenna only retrieves information from a direction of one sector within the cell. Thus, when sectors are added to a cell through the use of directional antennas, a capacity supported by the total system is increased by nearly a factor of S. Additional interference "leaking" into a sector from another sector reduces the frequency reuse factor, which ultimately adversely affects capacity. Such leaking may occur because of the side lobes and back lobes of the emanations from the antennas. For more information on proof of increased capacity due to sectorization, refer to the TIA/EIA/IS-95-A and TSB74 standard published by TIA/EIA.

Figure 3:
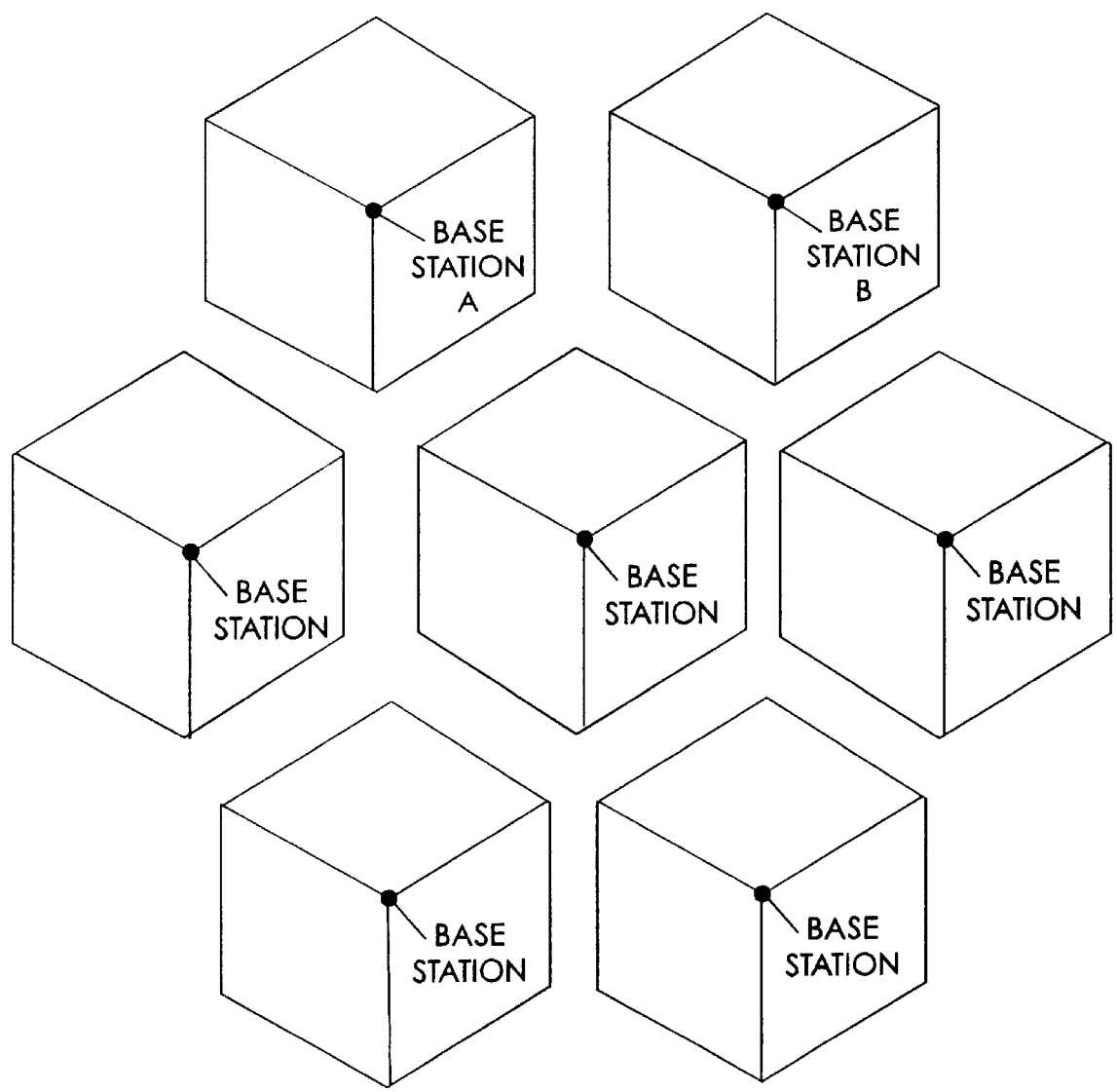
FIG. 3 illustrates, in block diagram form, a wireless network having multi-sectored cells in accordance with one embodiment of the present invention.

When the above equations are analyzed, it may be observed that a tri-sectored cell in the communication network such as that illustrated in FIG. 3 has nearly three times the capacity of an omni (or 1)-sectored cell such as that illustrated in FIG. 1 covering the same area. Furthermore, the capacity for a six-sectored cell is greater than the capacity of either the omni- or tri-sectored cell covering the same area. As an example, assume that, on average, each sector of the tri-sectored cell is able to provide services for about users per sector. A six-sectored cell could probably then provide services for approximately $\hat{\ }$ users per sector, where $\hat{\ } <$. Thus, if both cells cover the same area, the tri-sectored cell could provide services for about 3 users, while a six-sectored cell could provide services for about 6 users, where it is expected that $3 < \hat{6}$.

In addition to sectorization, the forward link capacity of a CDMA communication system may also be increased by minimizing "handoff" and minimizing the average forward link power required to sustain adequate communication between a mobile user and a base station. Each of these parameters will subsequently be discussed below.

Handoff occurs as a mobile user moves between the coverage areas of different base stations. When a mobile user is engaged in a call, the mobile user will frequently move out of the coverage area of the base station with which it is in communication and into another coverage area serviced by a separate base station. CDMA wireless communication technology provides for a very smooth transition by allowing a mobile user to access two sectors or two cells concurrently. The transition of a mobile user from one cell to another cell within a wireless communications network is referred to as a "soft" handoff and the transition of a mobile user from one sector to a second sector within a same cell is referred to as "softer" handoff. These forms of handoff will subsequently be described in greater detail.

During operation, a mobile user demodulates received information and sends modulated information to a base station corresponding to a cell in a wireless communication network. Furthermore, the mobile user also searches for unique pilot signals which serve as a form of sector identification. A mobile user detects a pilot signal by correlating a particular pilot signal with its unique code, also referred to as PN sequence. If the mobile user detects a new pilot by detecting a sector which is not currently in communication with the mobile user which is above certain strength, the mobile user will send a Pilot Strength Measurement Message (PSMM) to the base station controller (BSC) via antenna(s) corresponding to the sector(s) with which it is currently communicating. The PSMM is used by the mobile user to request that the new sector be added to the mobile user's "active set," which indicates a set of sectors that are currently in communication with the mobile user. The BSC instructs the mobile user to add this new pilot to its active set via a Handoff Direction Message (HDM) transmitted by all the sectors in a current active set. Upon receiving the HDM, the mobile user will add this new sector to its active set, and acknowledge this action via a third message referred to as a Handoff Completion Message (HCM). If the mobile user detects that a current active set pilot signal strength has dropped below a certain threshold level and has stayed below that threshold level for a predetermined amount of time, then the mobile user sends a PSMM to the BSC, requesting that the sector be dropped from its active set. Subsequently, the BSC provides an HDM and the mobile user provides an HCM in response to the HDM.

Figure 4:
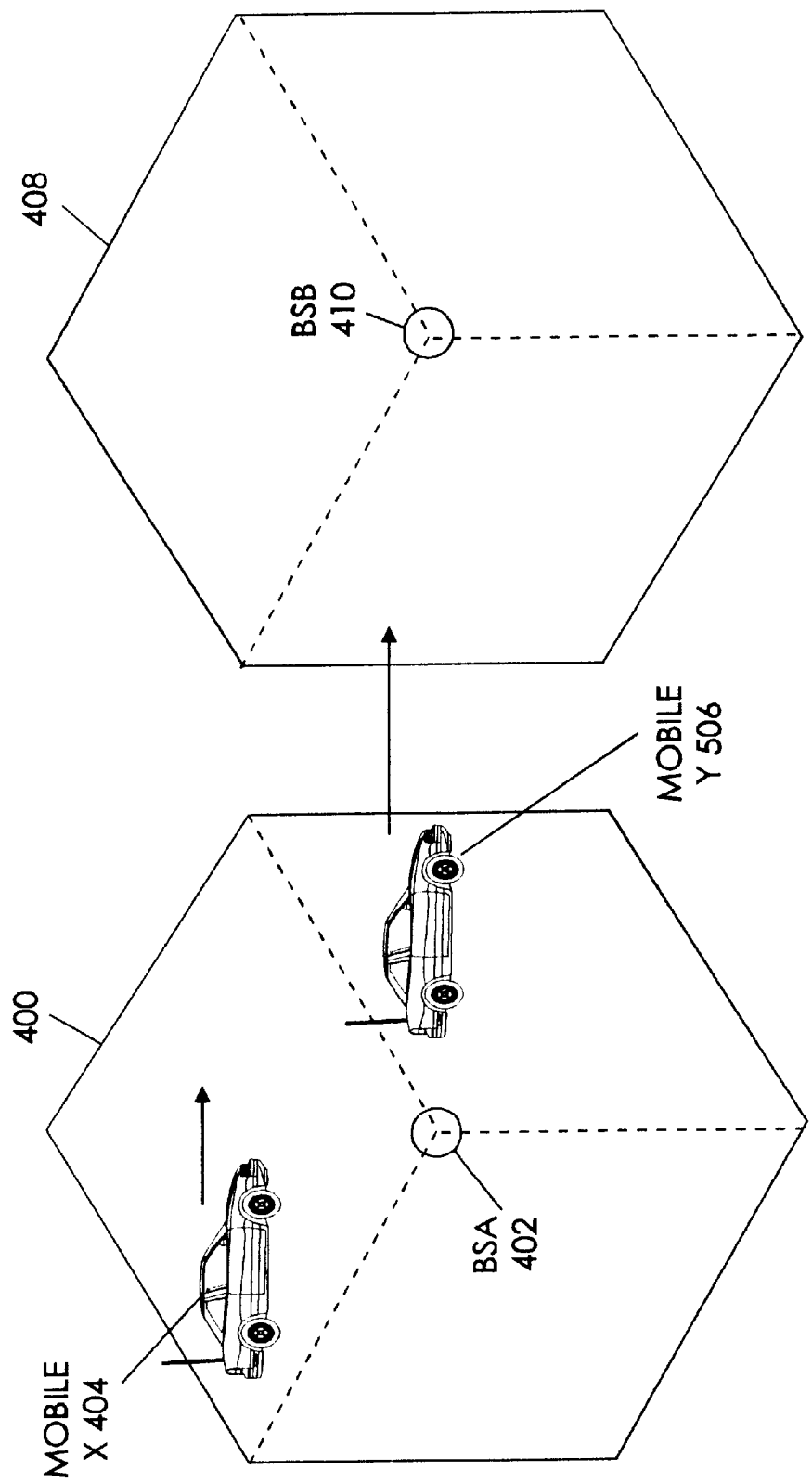
FIG. 4 illustrates, in block diagram form, a cellular network having multi-sectored cells in accordance with one embodiment of the present invention.

With this general description of handoff in a CDMA communication network, the following description will provide a discussion of the differences between soft handoff and softer handoff. For purposes of this discussion, refer to FIG. 4. In FIG. 4, cell 400 and cell 408 are each divided into three sectors, as indicated by the dashed lines. In cell 400, a single base station A (BSA) 402 is placed at a center of cell 400. As mobile user X 404 moves from a first sector to a second sector of cell 400, mobile user X will experience a softer handoff function performed by BSA 402. However, when mobile user Y 406 moves from a first cell 400 to a second cell 408, a soft handoff function occurs. Stated another way, in softer handoff, a mobile user is communicating with two or more sectors of the same cell. Conversely, during soft handoff, the mobile user is communicating with two sectors in different cells. During operation, the difference between soft handoff and softer handoff is differentiated by hardware resources assignments, referred to as channel elements herein, within each of the base stations. Such channel elements and their assignment will subsequently be discussed below.

For each mobile user within a cell, a channel element will be assigned in a base station corresponding to that cell. A channel element is a hardware device which prepares all physical layer functions for a mobile user. Physical layers indicate a conversion between air interface modulated information to groups of binary values (1's and 0's). Because channel elements must be assigned to a single mobile user at a certain point in time, a number of mobile users within a cell is limited by a number of channel elements within that cell During a soft handoff operation, such as that occurring when mobile user Y 506 travels from a coverage area of BSA 402 to a coverage area of BSB 410, channel elements are reserved in both BSA 402 and BSB 410 to ensure that there is a smooth transition as mobile user Y 406 travels between cell 400 and cell 408. Thus, in a soft handoff operation, two different channel elements must be allocated from two different base stations (BSA 402 and BSB 410). While such duplicative use of channel elements is required in the CDMA technology to ensure a smooth transition for a mobile user between cells, such duplicative use is not an efficient use of the resources of a base station and should be minimized where possible.

In contrast, softer handoff refers to a transition which occurs when a mobile user, such as mobile user X 404, travels from a first sector to a second sector within the same cell. In this situation, the same base station, BSA 402, provides control and information for mobile user X 404. Because the same base station is utilized, there is no need to assign different channel elements even though the mobile user has traveled from one sector to another. In a softer handoff situation, the same channel element is utilized for both sectors because they are both included within the same cell. For these reasons, softer handoff is more economical than soft handoff, in transitions of mobile users within a wireless cellular network.

In addition to concerns regarding the efficient use of channel elements in a base station, limitations of the computing capability of a mobile user must also be evaluated to maximize capacity in a wireless communication system. Chief among these computing limitations is the fact that a mobile user can demodulate only a certain number of received communication signals, or paths. Consequently, the mobile user will attempt to demodulate the highest quality paths from any of the links at any instant in time. Furthermore, quality of the paths changes as the RF (radio frequency) conditions changes. Hence, a problem faced with a high handoff rate is that the capacity of the cellular area is sacrificed as there are sectors having to use power to transmit signals, even though the mobile user is demodulating signals received from other sectors. Stated another way, three or four sectors are all transmitting signals to a mobile user, but the mobile user can only demodulate a limited number of signals due to the limitations of the RAKE receiver (Note: The RAKE receiver receives its name because it resembles an ordinary garden rake and functions like a garden rake in the manner in which it collects signal energy from all the resolvable multipath signal components.). Therefore, transmitters in some sectors may be transmitting data to the mobile user and using power unnecessarily.

For example, most CDMA mobile users have RAKE receivers as part of their signal demodulating hardware. RAKE receivers are well-known to those with skill in the art and will not be described in greater detail herein. However, for additional information about RAKE receivers, refer to *Communication Systems Engineering*, by John G. Proakis, et al., published by Prentice-Hall, Inc., 1994, pp. 840–841, which is hereby incorporated by reference herein.

Currently, most mobile users of the CDMA cellular technology only have three RAKE fingers for signal demodulation. Stated another way, a RAKE receiver within a telephone unit of the mobile user can only demodulate a maximum of three signal paths in most current cellular telephone implementations. Therefore, when excessive handoff occurs and multiple channel elements provide signals to the mobile user, a large amount of dispersed power will result. For example, a base station associated with a sector involved in a handoff operation transmits information to the mobile user in a single signal stream; however, because of an RF (radio frequency) phenomena due to various channel considerations (i.e., reflections from buildings), the signal streams are split. Because signal streams are split, dispersed power adversely affects the capacity of the CDMA cellular system, as more power will be required for a successful demodulation operation performed by the mobile user. Such operations occur whether a soft or softer handoff occurs. However, when a softer handoff operation occurs, power control bits may be transmitted at a power, $\beta$, as they are from a same channel element. In a soft handoff operation, power control bits must generally be transmitted at higher power, $\hat{\beta}(\hat{\beta}>\beta)$ as they are from different channel elements and, hence may be different. It should be noted that power control bits are punctured onto a data stream and are not modulated or encoded. Therefore, in a soft handoff operation, the power control bits may be different as they are provided from different channel elements, and, therefore, must be transmitted at a higher power since the path diversity concept be used. Upon receipt of those power control bits, a mobile user powers up or powers down in response thereto.

Additionally, each base station communicating with a mobile user also has a RAKE receiver, which typically has four demodulating fingers. If the mobile user is involved in softer handoff, the same RAKE receiver is used to demodulate the information, as long as the sectors are supported by the same base station. Subsequently, based on the four strongest paths from the mobile user, the signals are "diversity combined." However, if the mobile user is involved in a soft handoff between two cells using different base stations, then each individual RAKE receiver will combine the four best paths which it receives and transmits the resulting information frames to the BSC. The BSC will then select the best frame on a frame-by-frame basis. It should be well-known to those with skill in the art that a number of paths which a RAKE receiver will combine is a configurable parameter. Therefore, while the RAKE receiver described herein combines four best paths, more or less paths may be combined by alternate implementations of RAKE receivers. Thus, the softer diversity gain is generally superior to the soft diversity gain.

In addition to increasing capacity of a CDMA wireless communication network through minimal handoff operations, the capacity of a CDMA cellular/PCS communication network can also be increased by minimizing an average power required to sustain adequate communication between a mobile user and a base station. Theoretically, in operation of a cellular communication network, the system capacity is sub-optimal unless the transmitted power of each mobile station is controlled so that a corresponding signal arrives at the cell cite with the minimum required signal-to-interference ratio. A frame error rate which measures frames corrupted during transmission will be too high to permit good quality communication if the mobile user signal arrives at the base station with a received power value which is too low. However, if the received power value is too high, the communication will be adequate, but the interference to all other mobile users within a sector will be increased and, therefore, the performance of all other mobile users in the sector will be degraded. Similarly, a forward link from the base station to the mobile user should be optimal as well. In certain locations, a link from a base station to a mobile user may be bad, unless the power transmitted to the mobile user is increased. At other times, the mobile user may be located in an area where the signal-to-interference ratio is very good, therefore, the base station could transmit data at a lower power to reduce interference and increase the available power for other users.

To regulate power for use by the mobile user and the base station, a power control methodology is often implemented to provide for optimal performance and maximized capacity. A first form of power control utilizes outbound link path record signal strength at the mobile user to allow the mobile user to adjust its own transmitted power. The stronger the total forward link received signal by the mobile, the lower the transmitted power of the mobile user. Furthermore, a strong received signal indicates a good path (probably because of proximity) between a base station and a mobile user. Conversely, a weak receive signal indicates a bad path between the base station and the mobile user.

A forward link between the base station and the mobile user and a reverse link between the mobile user and the base station use different frequency bands to operate. This frequency separation allows the mobile user and the base station to simultaneously operate without feedback or interference between transmitters and receivers. However, this separation has an important effect on power control. Since the frequency separation is outside the coherent bandwidth of the channel, the forward link and reverse link paths fade independently. Consequently, reverse open loop power control which is based on the forward link usually corrects for the average transmit power required by the mobile user, but cannot make any additional provisions due to the independent fading. To account for this inability, the mobile user transmitter power is controlled via the base station. Each base station involved in a handoff operation measures the received signal-to-interference ratio from the mobile user. The measured signal-to-interference ratio is compared to the desired signal-to-interference ratio from each mobile user. Based on the comparison, each base station sends a power adjustment to the mobile user. The power adjustment command is combined with the mobile users open loop estimate to obtain a final value of the mobile user transmit radiated power.

While this methodology works well in theory, in practice this methodology results in mobile users receiving conflicting information from varied base stations during a soft handoff operation. In contrast, mobile users will not receive conflicting information during a softer handoff operation. Such conflicting information could adversely affect performance of the mobile user.

Operation of the present invention will be provided below in view of the previously described characteristics of a CDMA wireless cellular and PCS communication network.

Description of Operation

The present invention recognizes the characteristics of a CDMA wireless communication network. In the present invention, a demand for service within a cellular network is so high that a single base station may not be utilized to provide enough capacity to mobile users within the area. Thus, even a tri-sectored cell, such as that illustrated in FIG. 3, is not sufficient.

Figure 5:
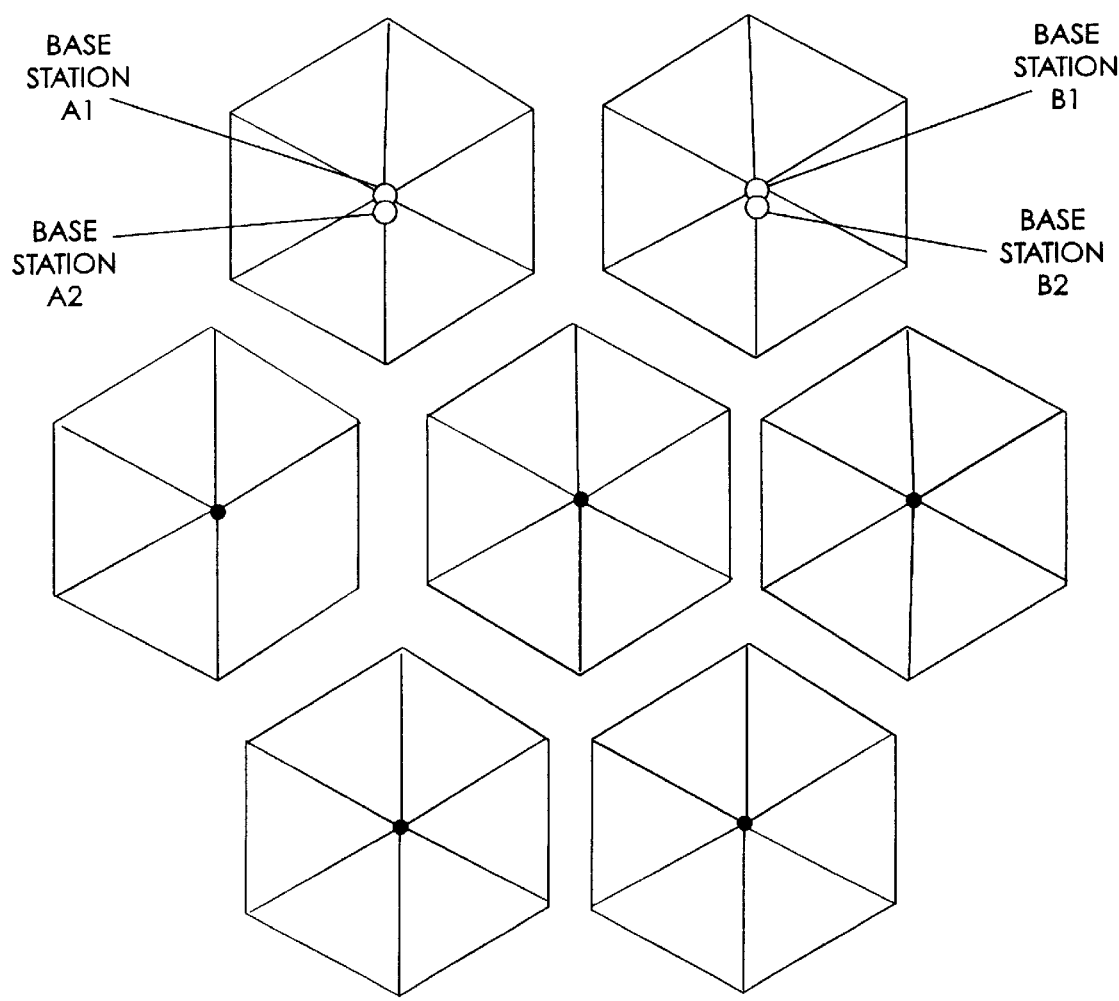
FIG. 5 illustrates, in block diagram form, a portion of a cellular network having multi-sectored cells.

Rather, the present invention recognizes that additional sectors should be implemented within a cell of a wireless communication network. However, given the limitations associated with current CDMA base stations implementations which only support three sectors, the present invention recognizes that two base stations will be required to be deployed in a six sector cell configuration to meet the needs of mobile users therein or three base stations dividing a cell into nine sectors. A cellular/PCS communication network having similar characteristics is illustrated in FIG. 5. Therefore, a first three sectors of this cell will be serviced by a first base station (BSA 1) and the second three sectors within the cell will be serviced by a second base station (BSA 2). Additionally, it should be noted that if additional sectors were required, additional base stations could be provided within the same cell. Stated another way, the present invention provides a best means for configuring "M" base stations to support "N" sectored cells.

In the present invention, a method for configuring the "M" base stations to support the "N" sectored cells is provided to ensure that each cell has a maximum amount of capacity for all mobile users therein. To explain the methodology of the present invention, an example will be provided. Consider that M=2 and N=6 in this example. In sectorizing a cell into N(6) sectors, a single base station would not be able to provide such a configuration using typical CDMA hardware. Therefore, two base stations must be utilized to implement this number of sectors. To determine which sector is to be served by which base station, many positional configurations exist. A first example of such a configuration is illustrated in FIG. 6.

Figure 6:
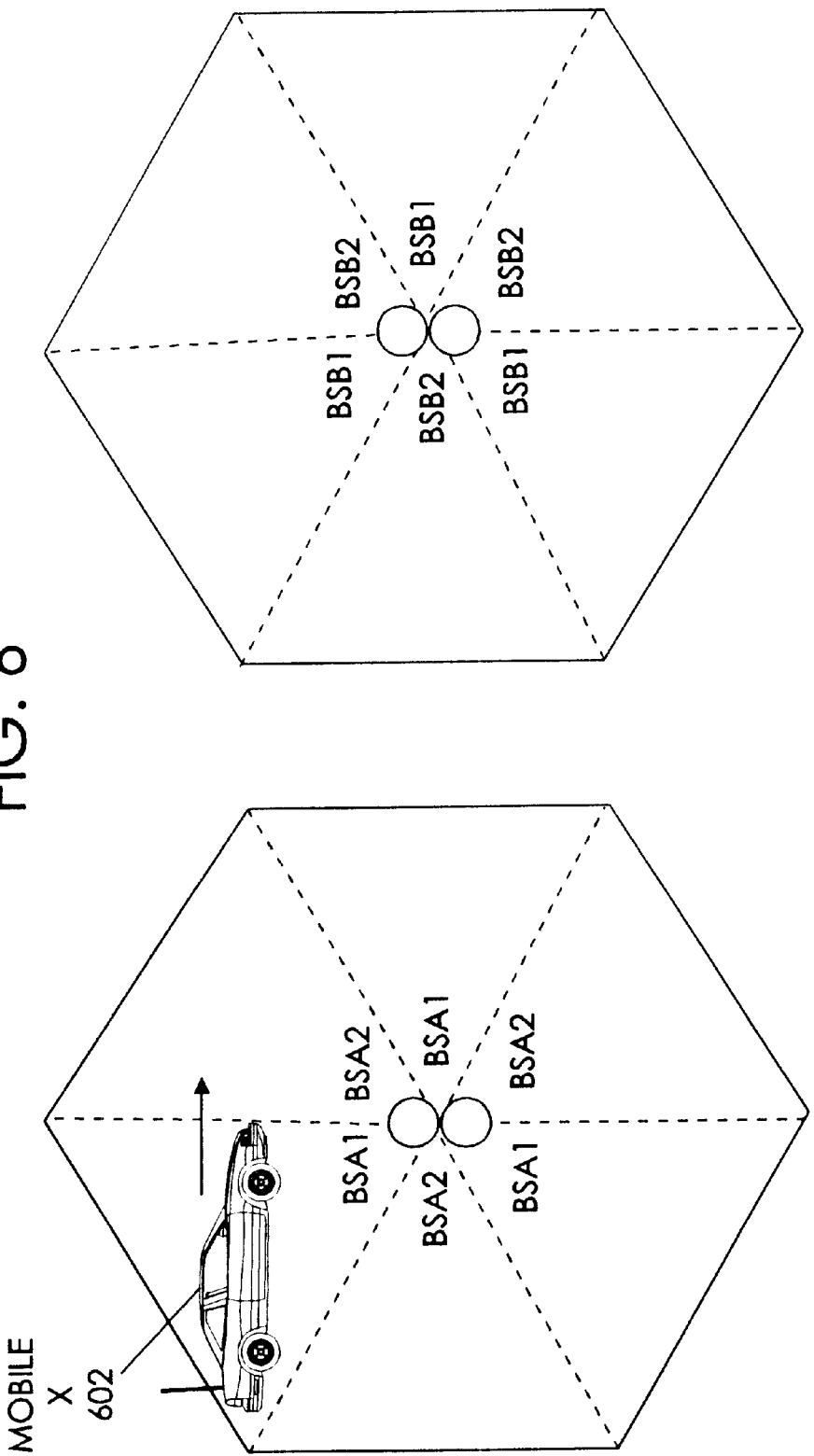
FIG. 6 illustrates, in block diagram form, a portion of a wireless cellular network having multi-sectored cells.

In FIG. 6, notice that sectors served by a first base station A (BSA 1) are alternately dispersed with a second base station A (BSA 2). In this configuration, each time mobile user X 602 moves from a first sector serviced by BSA 1 to a second sector serviced by BSA 2, a soft handoff operation will occur. As previously mentioned, in such soft handoff operations, a channel element must be assigned to mobile user X 602 in both BSA 1 and BSA 2. Furthermore, as previously mentioned, this results in a higher number of channel elements used per mobile user (on average) within the base stations and may limit the number of users which may receive service from a given sector of a base station.

Figure 7:
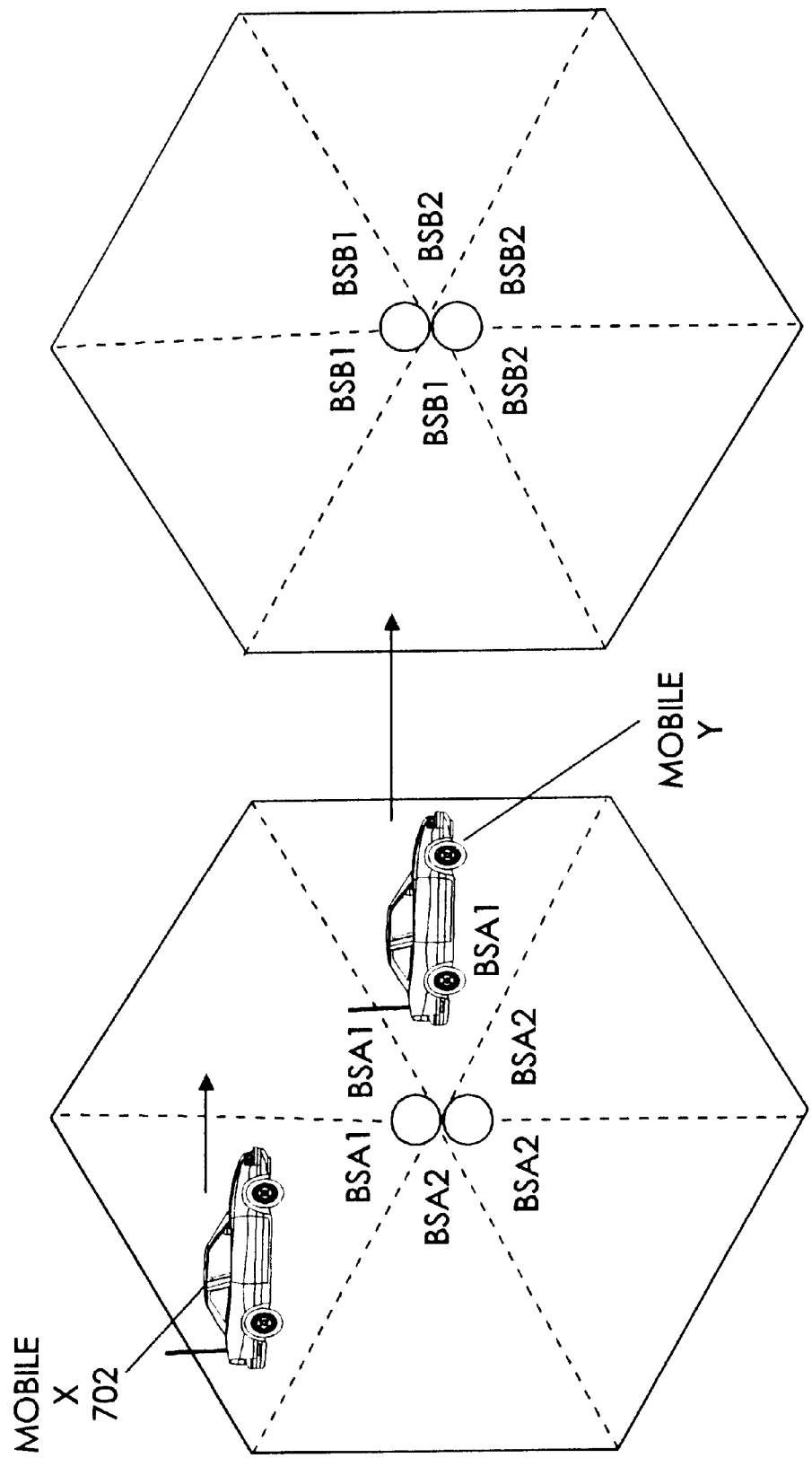
FIG. 7 illustrates, in block diagram form, a portion of a wireless cellular network having multiple sectors arranged within a cell in accordance with one embodiment of the present invention.

In the present invention, factors dealing with channel element allocation and service of users were carefully evaluated to determine that the base station should be configured in accordance with the figure illustrated in FIG. 7. In FIG. 7, all sectors serviced by the same base station are adjacent to one another. By configuring the sectors associated with the base stations in this manner, it was determined that there would be fewer instances of soft handoff and more instances of softer handoff. As previously mentioned, softer handoff does not require multiple base stations to assign different channel elements for the same mobile user. Therefore, mobile user X 702 in FIG. 7 may travel a greater distance and through several sectors while using the same channel element because the same base station controls three sectors.

Figure 8:
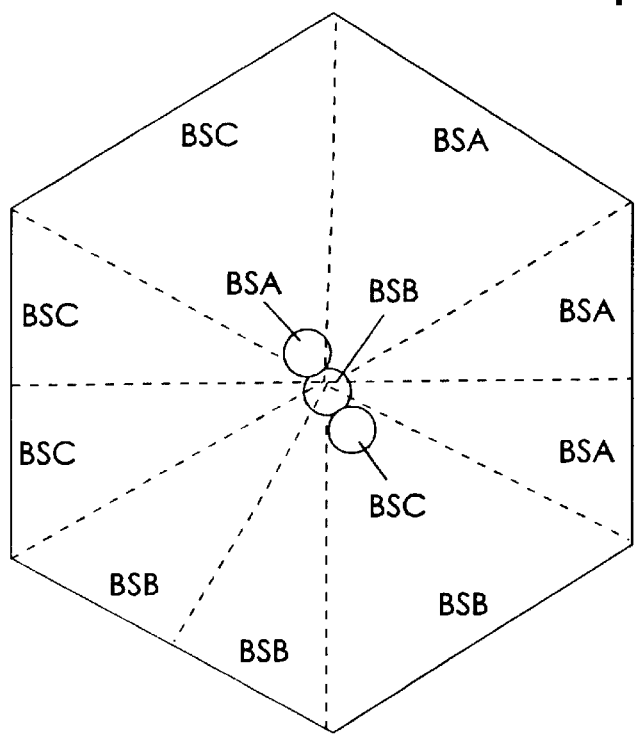
FIGS. 8 and 9 illustrates, in block diagram form, multiple sectors within a cell which are configured in accordance with one embodiment of the present invention.
Figure 9:
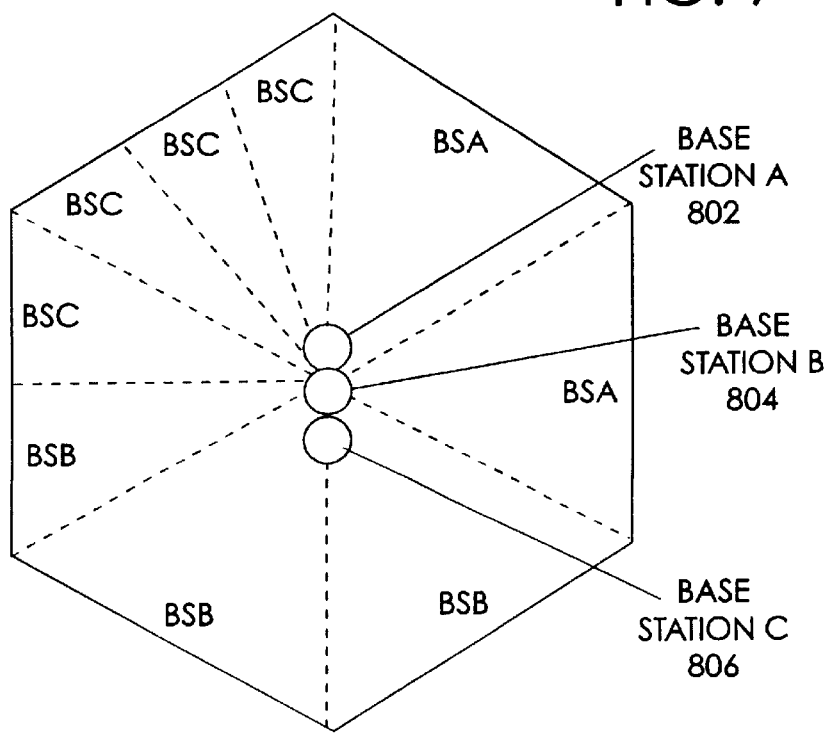

Furthermore, as illustrated in FIG. 8, the configuration of the present invention is not limited to symmetrical configurations. Assume, with reference to FIG. 8, that a first base station, base station A 802 is only able to support two sectors, while a base station B 804 is able to support three sectors and a base station C 806 is able to support four sectors. In this situation, the optimal arrangement will have as many adjacent sectors as possible corresponding to a single base station.

The advantages of configuring base stations in accordance with the present invention are varied. To provide clarification as to these advantages, consider the following example. In the following example, assume that a mobile user is in handoff with sectors alpha, beta, and gamma. If there is a significant multi-path signals and alpha, beta, and gamma are all sectors of a first base station, a dispersed power on a reverse link could be collected via a combining algorithm implemented by the one RAKE receiver. Furthermore, if either the alpha, beta, or gamma sectors corresponded to a second base station, then the dispersed power could not be collected as optimally and more reverse link power would be required for adequate communication, therefore resulting in reduced reverse link capacity of the CDMA system. Stated another way, the diversity obtained from softer handoff tends to be better than that obtained from soft handoff because the same hardware is utilized. For more information on the basics of diversity and diversity combining, refer to Chapter 5 of *Microwave Mobile Communications*, by William C. Jakes, published by IEEE Press, in 1993 (IEEE Order No. PC0423-4), which is hereby incorporated herein by reference. Consequently, the configuration of the present invention minimizes soft handoff at the expense of softer handoff to reduce an average number of channel elements required and to increase a better form of diversity.

For CDMA wireless communication networks, closed loop reverse link power control information is sent by the base stations. In softer handoff, the power control bit sent by the base stations are combined by the mobile users since they are the same. In soft handoff, however, this is not possible since the power control bits may not be the same as they come from different base stations. Additionally, the power control bits typically tend to be transmitted at higher gains during instances of soft handoff since they are unmodulated, punctured bits, and this can significantly affect the capacity of the CDMS system.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A wireless communication system having a cell comprised of a plurality of sectors, the cell comprising:

a plurality of base stations, wherein each of the plurality of base stations comprises:

a plurality of directional antennas for transmitting and receiving information, each of the plurality of directional antennas transmitting and receiving information with substantially only a preselected one of the plurality of sectors, wherein a first portion of the plurality of directional antennas corresponds to substantially only a first one of the plurality of base stations and transmits and receives information to and from a plurality of adjacent sectors; and wherein the wireless communication system implements a code division multiple access technology (CDMA).

2. The wireless communication system of claim 1, further comprising:

a plurality of mobile switching centers, wherein each of the plurality of mobile switching centers controls information provided to a preselected portion of the plurality of base stations.

3. The wireless communication system of claim 1 wherein the first one of the plurality of base stations services a first number of sectors in the cell and a second one of the plurality of base stations services a second number of sectors in the cell.

4. The wireless communication system of claim 1 wherein each of the plurality of base stations comprises a plurality of channel elements, each of the plurality of channel elements performing a physical layer operation corresponding to a mobile telephone user.

5. The wireless communication system of claim 4 wherein a first one of the plurality of channel elements of the first one of the plurality of base stations corresponds to a first mobile telephone user when the mobile telephone user travels within a first area serviced by the plurality of adjacent sectors.

6. The wireless communication system of claim 5 wherein a second one of the plurality of channel elements of a second one of the plurality of base stations corresponds to the first mobile telephone user when the mobile telephone user travels outside the first area serviced by the plurality of adjacent sectors.

7. A method for configuring a plurality of base stations within a cell of a wireless communication system, comprising the steps of:

implementing a first base station in the cell of the wireless communication system;

implementing a second base station in the cell of the wireless communication system;

enabling the first base station to control the transmission and reception of information to and from substantially only a fast plurality of adjacent sectors of the cell;

enabling the second base station to control the transmission and reception of information to and from substantially only a second plurality of adjacent sectors of the cell; and wherein the wireless communication system implements a code division multiple access technology (CDMA).

8. The method of claim 7, further comprising the steps of:

allocating a first channel element in the first base station to a mobile telephone user traveling in a first area covered by a first one of the first plurality of adjacent sectors of the cell; and enabling the first base station to continue to allocate the first channel element in the first base station to the mobile telephone user traveling in a second area covered by the first plurality of adjacent sectors of the cell.

9. The method of claim 8, further comprising the steps of:

allocating a second channel element in the second base station to the mobile telephone user traveling in a third area covered by a first one of the second plurality of adjacent sectors of the cell; and enabling the second base station to continue to allocate the second channel element in the second base station to the mobile telephone user traveling in a fourth area covered by the second plurality of adjacent sectors of the cell.

10. A wireless communication system having a first cell with a plurality of sectors, wherein the first cell comprises:

a first base station having a first plurality of directional antennas for communicating information, each of the first plurality of directional antennas communicating information with a first portion of the plurality of sectors;

a second base station having a second plurality of directional antennas for communicating information, each of the second plurality of directional antennas communicating information with a second portion of the plurality of sectors, wherein the first portion of the plurality of sectors and the second portion of the plurality of sectors are distinct; and wherein the wireless communication system implements a code division multiple access technology (CDMA).

11. The wireless communication system of claim 10 wherein the first base station and the second base station each comprise a plurality of channel elements, each of the plurality of channel elements performing a physical layer function corresponding to a mobile telephone user.

12. The wireless communication system of claim 11 wherein a first one of the plurality of channel elements of the first base station corresponds to a first mobile telephone user when the first mobile telephone user travels within a first area covered by the first portion of the plurality of sectors.

13. The wireless communication system of claim 12 wherein a second one of the plurality of channel elements of the second base station corresponds to the first mobile telephone user when the first mobile telephone user travels outside the first area covered by the first portion of the plurality of sectors.

14. The wireless communication system of claim 10 wherein:

the first base station includes the first plurality of directional antennas for transmitting and receiving information, each of the first plurality of directional antennas transmitting and receiving information with a first portion of the plurality of sectors; and the second base station includes the second plurality of directional antennas for transmitting and receiving information, each of the second plurality of directional antennas transmitting and receiving information with a second portion of the plurality of sectors.

15. The wireless communication system of claim 10 wherein:

the first base station includes the first plurality of directional antennas for transmitting and receiving information, each of the first plurality of directional antennas transmitting and receiving information with substantially only a first portion of the plurality of sectors; and the second base station includes the second plurality of directional antennas for transmitting and receiving information, each of the second plurality of directional antennas transmitting and receiving information with substantially only a second portion of the plurality of sectors.

* * * * *

UNITED STATES PATENT AND TRADEMARK OFFICE
CERTIFICATE OF CORRECTION

PATENT NO. : 6,151,512
DATED : November 21, 2000
INVENTOR(S) : Chheda et al.

It is certified that error appears in the above-identified patent and that said Letters Patent is hereby corrected as shown below:

Column 6,
Line 3, after "about", insert -- $\alpha$ --
Line 4, after "approximately", delete the " ^ " and insert -- $\hat{\alpha}$ --
Line 5, delete " ^ < " and insert -- $\hat{\alpha} < \alpha$ --
Line 6, after "3", insert -- $\alpha$ --
Line 7, delete "6", and insert -- $6\hat{\alpha}$ --
Line 8, delete "3<6" and insert -- $3\alpha < 6\hat{\alpha}$ --

Column 7,
Line 22, after "cell", insert a -- . --
Line 23, delete "506" and insert -- 406 --

Signed and Sealed this

Twelfth Day of February, 2002

Attest:

JAMES E. ROGAN
*Director of the United States Patent and Trademark Office*

*Attesting Officer*